Patented Oct. 7, 1941

2,258,545

UNITED STATES PATENT OFFICE 2,258,545

PROCESS OF PURIFYING ELECTROLYTIC CELL LIQUOR

Richard Lloyd Davies, Philadelphia, Pa., assignor to Pennsylvania Salt Manufacturing Company, Philadelphia, Pa., a corporation of Pennsylvania No Drawing. Application May 15, 1937, Serial No. 142,929

4 Claims. (Cl. 23—184)

My invention relates to a process of treating electrolytic cell liquor of an alkali metal hydroxide containing an alkali metal chlorate to form therein chlorides, and magnetic oxide of iron in an amorphous form suitable for use in the arts, and more particularly it relates to a process for purifying electrolytic cell liquor to destroy the chlorate therein by converting it into a chloride with the accompanying formation of the iron oxide described.

One object of my invention is to provide a simple and economical method of treating chlorate-containing electrolytic cell liquors by adding thereto a chemical compound which reacts with the chlorate contained in the liquor to form a chloride and a compound of value as a pigment.

A further object of the invention is to furnish a process by which the sodium chlorate contained in caustic soda solutions such as those obtained electrolytically in diaphragm cells, may be eliminated therefrom by furnishing ferrous hydroxide to the solution, which compound reacts with the chlorate to form a by-product of more than sufficient value to cover the cost of the process.

Other objects will be apparent from a consideration of the specification and claims.

The invention will be specifically described in conjunction with the treatment of caustic soda cell liquors, but it is to be understood that it is applicable for use in the treatment of other solutions of this type, such as caustic potash cell liquors.

In the operation of electrolytic alkali-chlorine cells, the cathode liquors containing caustic soda in solution often contain a small quantity of sodium chlorate, at least a portion of which is not destroyed during the concentration of the liquors. Even traces of chlorate are objectionable for some uses, and the removal of this impurity is necessary if caustic soda from diaphragm cells is to be prepared of a purity equal to that obtained from mercury cells. Furthermore, when solid caustic soda is to be made, the chlorate, if not previously eliminated, is decomposed in the caustic pots to form oxygen and sodium chloride, the latter chemical remaining as an impurity in the solid caustic soda since it cannot be removed therefrom.

By the process of the present invention, the sodium chlorate is destroyed in concentrated solutions of the cell liquors, that is, solutions of at least about 30% alkali, metal hydroxide and the sodium chloride formed may then be removed with the sodium chloride impurity normally encountered in the caustic soda solutions, for example in the crystallization of the sodium chloride upon evaporation of the solution. If the treatment is carried out after the removal of the major portion of the sodium chloride by crystallization, the sodium chloride may be removed by the addition of sodium sulphate to the concentrated caustic soda solutions in accordance with the process of United States Patent No. 1,888,886. As previously indicated, the process results in the formation, in addition to the sodium chloride, of a valuable by-product which may easily be removed from the solution, preferably prior to the removal of the sodium chloride.

The process of the present invention contemplates the reaction of the sodium chlorate with ferrous hydroxide to form black magnetic iron oxide ($Fe_3O_4$) in an amorphous form, sodium chloride and water in accordance with the following equation:

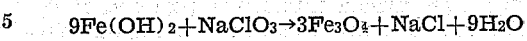

$$9Fe(OH)_2 + NaClO_3 \rightarrow 3Fe_3O_4 + NaCl + 9H_2O$$

The ferrous hydroxide may be furnished by the addition of this compound to the caustic soda solution, but since the simplest manner to prepare this chemical is by the precipitation of a ferrous salt with caustic soda, and since ferrous hydroxide is easily oxidized, the addition of a soluble ferrous salt directly to the caustic soda solution to be treated is often the procedure to be recommended. While various soluble ferrous salts may be added, the use of the chloride, or the sulphate, or a mixture of these two salts, or a mixture of one or both of the salts and ferrous hydroxide is preferred. The use of at least a portion of ferrous sulphate may be advantageous, since then sulphate radical will be furnished to the solution to form, with the sodium chloride, a complex salt, insoluble in concentrated caustic soda solutions, which salt may be removed by filtration. Ferrous hydroxide itself and the various soluble ferrous salts forming ferrous hydroxide in the cell liquor are designated herein as a ferrous compound furnishing ferrous hydroxide to the cell liquor.

While the theoretical amount of ferrous hydroxide, or of the ferrous salt, will destroy all of the sodium chlorate in the caustic soda solution treated, it has been found that 75% to 85% of the ferrous hydroxide theoretically required results in the elimination of all of sodium chlorate present, when the cell liquor treated has the concentration of at least about 30% NaOH, for example about 30% to 50% NaOH, as contemplated herein.

As previously stated, a concentrated solution of the cell liquor is treated, that is, for example, a solution varying in strength from about 30% to 50% or from about 398 grams per liter to 750 grams per liter. The amount of chlorate impurity present in the cathode liquors depends upon the efficiency of the cell operation. With a high current efficiency such as 95%, the chlorate content should be below .05 gram per liter, but with a current efficiency of 85%, the chlorate content can easily reach .1 gram per liter or more.

When these liquors are concentrated to a caustic soda content of 750 grams per liter, the chlorate content rises in some cases to 10 grams per liter or higher. Solutions of a sodium chlorate content within the limits given are among those found to be applicable for treatment by the process of the invention.

After the addition of the ferrous compound furnishing ferrous hydroxide to the cell liquor, the liquor may be advantageously heated, for example, it may be boiled for five minutes to hasten the reaction. The ferrosoferric oxide or magnetic oxide of iron ($Fe_3O_4$) formed by the reaction is removed by filtration or other suitable procedure. The black magnetic iron oxide is of use in the arts, for example as a pigment due to its amorphous nature and consequent high covering power, and is of more than sufficient value to cover the cost of the treatment.

The theoretical amount of ferrous hydroxide required to react with 1 gram of sodium chlorate to form sodium chloride therefrom is 7.62 grams, and in the following examples, the use of this theoretical amount as well as of smaller amounts is illustrated:

*Example A*

A solution of caustic soda containing 779 grams per liter of NaOH and .61 gram per liter of $NaClO_3$ was divided into three portions of 400 c. c. each, and each portion was treated with ferrous hydroxide followed by boiling for five minutes. The following table sets forth the data and results:

| Solution No. | Grams of $NaClO_3$ present | Grams of $Fe(OH)_2$ added | Percent of theoretical $Fe(OH)_2$ required | Grams of $NaClO_3$ after test | Percent of $NaClO_3$ destroyed |
|---|---|---|---|---|---|
| 1 | .244 | .93 | 50.0 | .120 | 50.9 |
| 2 | .244 | 1.40 | 75.0 | .048 | 80.3 |
| 3 | .244 | 1.86 | 100.0 | None | 100.0 |

*Example B*

A caustic soda solution containing 50% NaOH and 8.45 grams per liter of $NaClO_3$ was divided into three equal parts of 100 c. c. each. Ferrous hydroxide was prepared by precipitating the iron from $FeSO_4 \cdot 7H_2O$ with cell liquor which contained 100 grams per liter of NaOH, 200 grams per liter of NaCl and 1 gram per liter of $NaClO_3$. The ferrous hydroxide was filtered from the solution and added to the NaOH solutions to be treated, and the solutions were boiled for five minutes. The following table sets forth the data and results:

| Solution No. | Grams $FeSO_4 \cdot 7H_2O$ used in precipitating $Fe(OH)_2$ | C. c. cell liquor used in precipitating $Fe(OH)_2$ | Percent of theoretical $Fe(OH)_2$ required | Grams $NaClO_3$ after test | Percent $NaClO_3$ destroyed |
|---|---|---|---|---|---|
| 1 | 10.125 | 30.3 | 50.0 | .355 | 58.1 |
| 2 | 15.187 | 45.3 | 75.0 | Trace | 99.9 |
| 3 | 20.250 | 60.5 | 100.0 | None | 100.0 |

*Example C*

A caustic soda solution containing 30% NaOH and 4.12 grams per liter of $NaClO_3$ was divided into three portions of 400 c. c. each. Ferrous hydroxide was added thereto and the solutions were boiled for five minutes. The following table sets forth the data and results:

| Solution No. | Grams of $Fe(OH)_2$ added | Percent of theoretical $Fe(OH)_2$ required | Grams $NaClO_3$ after test | Percent $NaClO_3$ destroyed |
|---|---|---|---|---|
| 1 | 6.25 | 50.0 | 0.75 | 54.5 |
| 2 | 9.40 | 75.0 | 0.01 | 99.5 |
| 3 | 10.45 | 83.5 | None | 100.0 |

Considerable modification is possible in the chlorate-containing liquors treated, as well as in the steps of the process and the amounts of ferrous hydroxide reacted with the chlorate without departing from the essential features of the invention.

I claim:

1. The process of purifying electrolytic cell liquor of an alkali metal hydroxide having a concentration of from about 30% to 50% alkali metal hydroxide, to remove substantially the alkali metal chlorate therefrom which comprises furnishing ferrous hydroxide to said liquor by the addition of a ferrous compound thereto, heating the liquor to convert alkali metal chlorate contained in said solution into an alkali metal chloride and the ferrous hydroxide into a precipitate which is substantially magnetic oxide of iron, the amount of ferrous hydroxide furnished to said liquor being from about 75% to 85% of that theoretically required by the equation: $9Fe(OH)_2 + NaClO_3 = 3Fe_3O_4 + NaCl + 9H_2O$, and thereafter removing the said insoluble oxide of iron from said liquor.

2. The process of claim 1 wherein the electrolytic cell liquor is a solution of caustic soda containing sodium chlorate and wherein said sodium chlorate is converted into sodium chloride.

3. The process of purifying electrolytic cell alkali metal hydroxide liquor having a concentration of at least about 30% alkali metal hydroxide, to remove substantially the alkali metal chlorate therefrom which comprises reacting ferrous hydroxide, furnished to said liquor by the addition of a ferrous compound thereto, with alkali metal chlorate contained in said liquor to convert said alkali metal chlorate to alkali metal chloride, the amount of ferrous hydroxide furnished the said liquor being from about 75% to 85% of that theoretically required by the equation:

$$9Fe(OH)_2 + NaClO_3 = 3Fe_3O_4 + NaCl + 9H_2O$$

4. The process of claim 3 wherein the electrolytic cell liquor is a solution of caustic soda containing sodium chlorate and wherein said sodium chlorate is converted into sodium chloride.

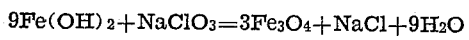

RICHARD LLOYD DAVIES.